Jan. 18, 1949.  A. S. SMITH  2,459,464
DETOXIFICATION OF CYANIDE-CONTAINING
INDUSTRIAL WASTE LIQUORS
Filed Nov. 6, 1945
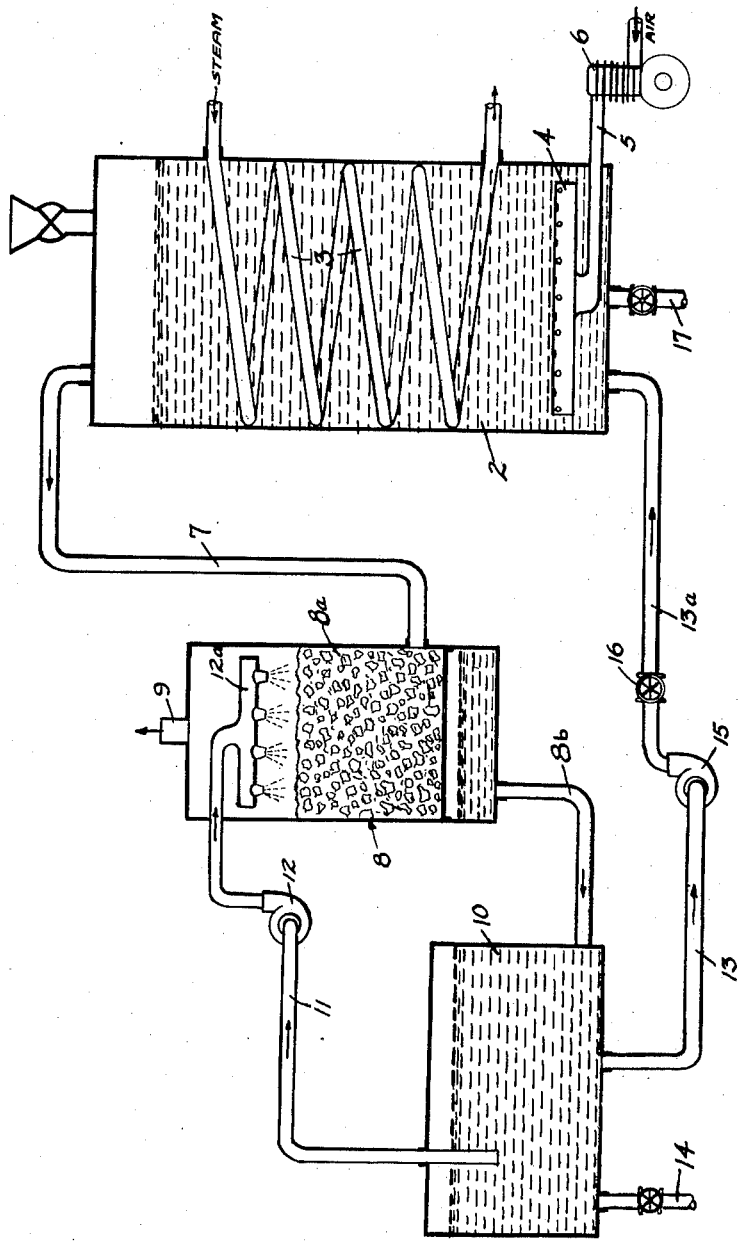
INVENTOR.
ALLEN S. SMITH
by Roy F. Steward
his attorney Patented Jan. 18, 1949

2,459,464

UNITED STATES PATENT OFFICE 2,459,464

DETOXIFICATION OF CYANIDE-CONTAINING INDUSTRIAL WASTE LIQUORS

Allen S. Smith, Ann Arbor, Mich., assignor to Blaw-Knox Company, Pittsburgh, Pa., a corporation of New Jersey Application November 6, 1945, Serial No. 626,989

8 Claims. (Cl. 23—150)

This invention relates to the detoxification of cyanide-containing industrial waste liquors; and it comprises a process of treating liquors of this kind in such manner as to eliminate the toxic cyanide content thereof either completely or so nearly completely that the resultant liquid effluent is unobjectionable from the standpoint of stream pollution. The term "cyanide" as here employed is to be understood as signifying a compound which, in water solution, gives rise to the simple and highly toxic cyanide ion CN; and the process of the invention is characterized, at least in essential part, by destruction of the toxic combination or group CN in such manner as to yield only carbon dioxide and ammonia, gaseous products which may be discharged harmlessly into the atmosphere, or either of which, where desirable, may be recovered by suitable absorption procedure. In the best embodiments of the invention, the destruction of the toxic CN content by conversion thereof into the harmless gaseous products aforesaid, is carried so far that no content of this CN component can be detected by standard chemical tests recognized as very sensitive.

Typical examples of cyanide-containing waste liquors, to the detoxification of which the process of the invention is well adapted, are waste liquors from electroplating plants, and from metal cleaning operations in which cyanides are used. In such liquors, the cyanide present is usually that of an alkali metal, e. g. sodium or potassium, more commonly the former. Certain waste liquors from gas works and coke oven plants, which ordinarily contain ammonium cyanide, such for example as result from the recovery of ammonia from ammoniacal gas liquor by limiting and steam-distilling, are likewise susceptible of treatment by the process of the invention for production of substantially cyanide-free liquid effluents. It is to be understood, therefore, that such ammonium-cyanide-containing liquors also are included within the scope of the expression "industrial waste liquors," which is herein employed to designate broadly cyanide-containing liquors for the treatment of which the new process is applicable. In general, said process may be used to detoxify industrial liquors, from whatever source derived, which contain any of the soluble cyanides, including those of the alkali metals and ammonium, as well as of the alkaline earth metals, i. e. calcium, barium, strontium and magnesium; but the treatment of industrial waste liquor containing sodium cyanide is regarded as of greatest present practical utility and is therefore more particularly referred to hereinafter.

All such industrial waste liquors contain, in addition to a generally small percentage of cyanide, other substances which are characteristic of the respective sources which give rise to them. These other substances may include not only contaminants or impurities that accumulate in the liquor during this particular industrial use to which it may have been put, but often also one or more alkaline or other ingredients intentionally added in making up the original liquor or, as in the case of a gas liquor (e. g.), in treating a liquor to recover a desired component (e. g. ammonia) therefrom. In other words, a cyanide-containing solution of the type to which the process of the present invention can be successfully applied is essentially more or less complex in character. It is not merely a simple solution of a technically pure cyanide alone; indeed, it has been found by this applicant that, surprisingly enough, the present process is not effective if applied to such a pure cyanide solution.

Heretofore, despite numerous attempts to solve the problem during the last ten years or so especially, no process for the disposal of industrial waste liquors containing cyanides has been found which provides a sufficiently satisfactory practical solution of the problem to warrant actual use to more than a very limited extent. Most commonly the liquors are either diluted and run into sewer systems or are run into ponds where, over a period of time, cyanides are destroyed through atmospheric oxidation. One suggested method of procedure is to convert the cyanides into ferrocyanides and to precipitate ferrocyanides as relatively non-toxic insoluble salts, for example as Prussian blue or ferric ferrocyanide. Aside from the fact that this process does not destroy the highly toxic entity CN which essentially characterizes a cyanide as this term is herein employed, but merely converts it by addition of iron into a chemical complex possessing quite different properties, with the CN group or combination still intact although modified, the method is also inherently incapable, because of equilibrium considerations, of removing, even in this manner, more than about 95 to 97 per cent of the original toxic cyanide content. Moreover, if this procedure is used, there remains the problem of disposing of the insoluble complex cyanide products, which are extremely difficult to separate from the treated liquors. A somewhat analogous proposal is to heat waste cyanide liquors with iron hydroxide ore.

Other procedures involving oxidation of the cyanides have been suggested such, for example, as oxidation by means of potassium permanganate in alkaline solution to yield potassium cyanate, the manganese being precipitated as manganic hydroxide. This procedure, however, involves the use of relatively expensive chemicals, and it necessitates careful chemical control.

Still another procedure that has been suggested and also used commercially to some extent is the addition of sulphuric acid to the cyanide solution in order to liberate the cyanide as hydrocyanic acid. The hydrocyanic acid can be removed from the solution by sufficiently thorough aeration; but because of the extremely poisonous nature of this gas it is necessary to discharge the effluent gases from a tall stack in order to prevent poisonous accumulations thereof near the ground. Similarly, there have been several proposals to blow flue gases containing carbon dioxide through waste cyanide liquor, whereby to liberate hydrocyanic acid and carry it away. All such procedures provide no real solution of the problem but only a relatively costly way of side-stepping it by diffusing the undecomposed toxic agent into the atmosphere at an elevation supposedly great enough to be safe. There is no destruction of that agent, that is, no decomposition or conversion of it into innocuous products.

Again, in an effort to produce a cyanide-free ammonia distillate from crude gas works liquor containing ammonium cyanide and a larger proportion of hydrogen sulphide, it was long ago proposed to pass a stream of air along with the stripping stream through an ammonia still operated otherwise in the conventional manner; the object being, through the oxidizing action of the air, to cause retention in the still of the cyanide content by converting the same into thiocyanate which remains in and passes off with the waste liquor. The reactions which occur in this procedure, like those taking place in the above-mentioned method of cyanide removal by precipitation as insoluble ferrocyanides, fail to convert all the cyanide content of the liquor into other compounds, and can only reduce it to the equilibrium concentration of cyanide in the resultant final solution. In both cases, therefore, the treated liquor still contains in solution an appreciable amount of cyanide.

In accordance with the present invention, detoxification of a cyanide-containing waste liquor may be accomplished in a relatively simple and inexpensive manner, and to any desired extent up to substantial completeness, by making such adjustment of the composition of the waste liquor as may be required to bring it to approximate neutrality and to ensure the presence therein of ammonium ion in concentration that is at least substantially equivalent, chemically, to its toxic cyanide (CN) content, and subjecting the liquor to oxidizing treatment, desirably with the aid of heat to an extent that will result in operating temperatures not substantially below 60° C. and most desirably much higher, operating temperatures which approximate boiling or are at any rate within the range of 90° to 100° C. being generally optimum. Operation at the higher temperatures indicated reduces greatly the required time or duration of the treatment and affords other important practical advantages.

Obeservance of the described conditions characterizing the treating process with respect to approximate neutrality of the liquor and adequate concentration of ammonium ions therein are found to be essential to accomplishment of the desired break-up or decomposition of the toxic CN group, with formation of corresponding amounts of carbon dioxide ($CO_2$) and ammonia ($NH_3$) as gaseous end products.

Where the cyanide content of the liquor is not already in the form of ammonium cyanide, the condition that there be a sufficient concentration of ammonium ion is met by adding to the liquor an ammonium salt (other than ammonium cyanide) in amount substantially equivalent, chemically, to such cyanide content; and in practice it is desirable to add the ammonium salt in excess, in order to ensure completion of the desired over-all reaction. Where any of the cyanide content is in the form of ammonium cyanide, it is theoretically unnecessary, as to that part, to add an ammonium salt; but enough should be added to take care of any other cyanide or any hydrocyanic acid that may also be present and, for best results, to provide for some excess in the liquor. Where all or any part of the cyanide content of the untreated liquor is in the form of hydrocyanic acid, this may simply be neutralized by adding sufficient ammonia instead of the equivalent amount of an ammonium salt; but in this case also, it is desirable that some ammonium salt, other than ammonium cyanide, be present in excess of the theoretical requirements.

In carrying out the aforesaid oxidizing treatment, it is important that the liquor be neither sufficiently alkaline in reaction to cause liberation of ammonia directly from the salt or salts thereof present in the liquor, nor sufficiently acid to liberate hydrocyanic acid. In other words, as has already been emphasized, the reaction of the liquor should approximate neutrality. Most desirably, it is slightly on the acid side of neutral.

Since the gaseous end products of the over-all reaction, carbon dioxide and ammonia, continuously leave the liquor as they are formed, the equilibrium of the chemical reaction or reactions involved is continuously displaced in the direction of such formation. Therefore the reaction can be carried to completion, with destruction of the entire cyanide content of the liquor; and in the most desirable embodiments of the invention such total toxic cyanide content destruction is accomplished. If commercially desirable, the evolved ammonia may be recovered by absorption in a suitable aqueous acid and the required amount of the resultant ammonium salt returned to the process, in cycle. Ordinarily it is not worth while to recover the carbon dioxide, although this can be done by known methods.

Although the exact nature of the chemical reaction or reactions involved in carrying out the novel processes is not yet fully established or understood, what happens can apparently be represented generally by the following over-all reaction, which assumes that the cyanide present in the waste liquor to be detoxified is sodium cyanide, and that the ammonium salt added to ensure the required ammonium ion concentration therein is ammonium sulphate:

$$2NaCN + (NH_4)_2SO_4 + O_2 + 2H_2O = Na_2SO_4 + 4NH_3 + 2CO_2$$

Moreover, the conditions found necessary to observe in practicing the process are consistent with the view that the chemical conversion thus generally represented by the foregoing over-all reaction may result from several step or stage reactions involving transitional formation of urea, and hydrolysis thereof to give the observed final products, ammonia and carbon dioxide. Such assumed step or stage reactions could be as follows:

(1) Oxidation of sodium cyanide in the presence of ammonium sulphate, to form ammonium cyanate.

$$2NaCN + O_2 + (NH_4)_2SO_4 \rightleftarrows 2NH_4CNO + Na_2SO_4$$

(2) Isomerization of ammonium cyanate to carbamide or urea.

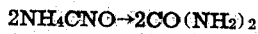

$$2NH_4CNO \rightarrow 2CO(NH_2)_2$$

(3) Hydrolysis of urea into ammonia and carbon dioxide.

$$2CO(NH_2)_2 + 2H_2O \rightarrow 4NH_3 + 2CO_2$$

It will be observed that the foregoing reactions (1), (2) and (3) can be combined to give the aforesaid over-all reaction. Reactions (2) and (3) are of course old and well known per se in other connections.

It is to be understood that the foregoing reactions are all suggested only as possibly providing an explanation of what takes place in the new process herein disclosed, without asserting that such explanation is certainly correct or in any way committing applicant to a theory of operation. The present invention rests upon observed facts, not upon theory.

In order to afford a fuller understanding of the invention, a practical embodiment thereof, involving application of the novel process to detoxification of a waste (spent) metal-cleaning solution containing cyanide, will now be described in detail by way of a specific example. This is to be understood as illustrative only and as in no sense limiting the scope of the invention.

Ordinarily, the cyanide content of cyanide solutions used for cleaning metal is largely in the form of alkali metal cyanide, commonly sodium cyanide because of its relative cheapness. One of the functions of the cyanide is to dissolve oxides from the metal to be cleaned. Such solutions are usually alkaline, due chiefly to the customary employment therein of a considerable proportion of more or less strongly alkaline cleaning agents such as sodium carbonate and phosphate, soap compounds, and the like. In the present instance, it may be assumed that the waste or spent cleaning liquor to be detoxified contains approximately 0.6% sodium cyanide, together with alkaline detergent materials, oils, soaps and, in general, foreign matter or impurities of the type commonly characterizing a waste metal-cleaning liquor. Its alkalinity is equivalent to about 20 grams of sodium hydroxide per liter, and its specific gravity is 1.03 at 60° F.

In this illustrative example, therefore, the first step in the processing procedure is to substantially neutralize the alkaline waste cyanide liquor by means of any suitable neutralizing agent. In general, it is preferable to employ an inorganic acid for this purpose, sulphuric acid being usually most desirable because it is the cheapest and most readily available. Enough sulphuric acid should be added and thoroughly mixed with the solution to bring its pH to between 8 and 7. It is desirable in order to avoid formation of free hydrocyanic acid and loss thereof into the atmosphere, not to reduce the pH below 7 in adding the acid. On the other hand, it is desirable from the standpoint of economical operation to carry the neutralization with sulphuric acid far enough to reduce the pH of the liquor to 8 or 7.5, in order to avoid unnecessary consumption, in neutralizing, of the more expensive ammonium sulphate also added.

The cyanide liquor having thus been brought nearly to the neutral point, an ammonium salt, in this instance ammonium sulphate, is added in the proportion of at least 1 molecule thereof for every 2 molecules of alkali metal cyanide contained in the liquor. Ordinarily, it is advantageous to add at least a slight excess of the ammonium salt in order to be sure that all of the cyanide will be decomposed in the subsequent steps of the process. The ammonium salt thus added should be one that is extensively ionized in aqueous solution. Such addition further lowers the pH of the liquor somewhat. Thus, in the present illustrative example, the final pH will be determined on the one hand by the ammonium sulphate, added in excess of the amount required for neutralization and subsequent reaction, and on the other by the products of the over-all reaction. In other words, the changes in pH value occurring after the nearly complete neutralization with sulphuric acid are due to the addition of ammonium sulphate in excess, followed by the formation of sodium sulphate as the over-all reaction eventually proceeds. The pH of the ammonium sulphate alone in aqueous solution is between 5 and 6; but in the liquor being processed this is counteracted to some extent by the higher pH of sodium sulphate, so that the resultant pH will be only slightly on the acid side of neutral, that is, only slightly below 7. This favors in maximum degree the ultimate formation of the desired end products, carbon dioxide and ammonia, in the detoxifying treatment, but is not acid enough to cause substantial loss of free hydrocyanic acid. It may be stated generally, therefore, that operating with the pH of the liquor undergoing treatment within the range 5 to 8 is optimum practice under the invention, but is not to be regarded as rigidly limiting.

After the required amount of ammonium sulphate or other suitable ammonium salt has been added, the liquor is heated to cause the detoxifying reaction or reactions to proceed at a sufficiently rapid rate to render the operation commercial. Below about 60° C., the reaction would proceed too slowly for commercial purposes. In actual practice, it is best to heat the liquor to well above 60° C., most desirably to a temperature at or only slightly below boiling, as is done in the present example. Besides increasing the velocity of the over-all reaction, heating the liquor has the further advantageous effect of decreasing the solubility therein of the end products, carbon dioxide and ammonia; and to the extent that water vapor, or steam if actual boiling of the liquor occurs, is evolved into the atmosphere above the liquor, this further reduces the partial pressures of the gaseous end products and thus aids in displacing the reaction equilibrium toward the right.

The liquor having been heated to the desired operating temperature, the oxidizing agent is introduced thereinto. The most economical way of accomplishing the desired oxidation is by blowing air into the liquor and allowing it to bubble up through the same. Where the destruction of the cyanide content is to be carried so far that there remains none detectable by sensitive qualitative tests, the blowing of the air through the solution while it is maintained hot should be contianued until such tests of the liquor are negative, and most desirably for some time thereafter. If the liquor is maintained well agitated throughout the operation, blowing air into it for an hour or so at a rate which need not exceed about 20 cubic feet per hour per gallon of liquor, and which in many cases may be substantially lower, ordinarily suffices to complete the over-all reaction and fully expel the gaseous end products from the detoxified effluent.

In order to determine whether the detoxifying treatment has been carried to the point where substantially the whole cyanide content of the liquor in question has been destroyed or decomposed, resort may be had to one or more of the following qualitative tests for the CN ion, recognized by chemists to be sensitive:

(1) Picric acid test, as described in Prescott & Johnson's Analytical Chemistry.

(2) Benzidine acetate test. In this test, 1 drop of 3% copper acetate, 5 drops of saturated benzidine acetate and 5 cc. of water are added, in this order, to a sample of the liquid to be tested. A deep blue color and precipitate indicates the presence of the CN ion.

(3) Prussian blue test. To 20 cc. of the solution to be tested, add 4 cc. of HCl and 1 drop of $FeCl_3$ solution. A blue precipitate indicates the presence of the CN ion.

Aside from chemical tests to determine whether the treatment has been carried far enough, an indication that the detoxifying reaction is approaching completion is afforded by a change which commonly occurs at about that time in the color of the liquor undergoing treatment. This is due to formation of a small quantity of a finely divided precipitate which remains suspended as agitation of the liquor continues, but which settles readily if the liquor is allowed to stand quietly. In the present illustrative example, the liquor takes on a red coloration as the reaction nears completion, and the precipitate which settles out upon standing is red. Its quantity, relative to the weight of waste liquor treated, is on the order of 0.10 per cent. It is organic in nature, and shows traces of metal content. It is probably formed from the oils and soaps present in the waste cyanide solution.

Whether the ability to effect detoxification of waste cyanide liquors by the process herein described is due to same catalytic effect of metallo-organic foreign matter present therein and giving rise to precipitates of the character just referred to, or is attributable to one or more of the other components or impurities which also generally characterize such liquors and which may likewise be broadly termed foreign matter, is not yet certain. But since, as stated hereinabove, the process fails to work when applied to pure cyanide solutions, it seems reasonable to suppose that there is some catalytic or assisting action exerted by the foreign matter characteristically present in waste cyanide liquors upon the progress of the chemical reaction or reactions involved in the detoxifying treatment.

After the aeration of the liquor has been completed, the treated liquor may be allowed to cool while standing quietly to allow any precipitated matter to settle out. The clarified liquor may then be decanted and run off into a sewer or directly into a stream without objectionable results. While separation of this precipitate by settling or otherwise is to be understood as not an indispensable feature of the novel process, it affords a clearer detoxified effluent, of course, and may therefore often be resorted to with advantage.

The accompanying drawing illustrates more or less diagrammatically one form of apparatus system or plant which may be employed for carrying out the new process. In this illustrative example, the process may be assumed to include the recovery of one of the gaseous end products, ammonia. Closed tank 2 serves as the reaction vessel or container in which the waste cyanide liquor, having its pH properly adjusted and containing ammonium ion in sufficient concentration, is heated by suitable means, such as closed steam coil 3, and is thoroughly aerated and agitated by means of small streams of air introduced into the liquor with considerable velocity through perforations in pipe 4 located near the bottom of the tank. The air is supplied to pipe 4 under proper pressure by pipe 5 through which it is forced by pump 6. The smaller the air bubbles and the greater the depth of liquor in the tank, the more effectively will the air be utilized; hence it is desirable that the tank 2 be relatively deep, as here shown. Any other suitable means for heating the body of liquor in the tank 2 may be employed in place of the closed steam coil illustrated. For example, steam may be blown directly into the liquor at a controllable rate.

Where it is not desired to recover the ammonia liberated from the liquor undergoing treatment, the exit pipe 7 leading from the space above the liquid in the reaction tank may discharge directly into the atmosphere. However, since in the present example the ammonia is to be recovered, said exit pipe leads into the lower part of a suitable ammonia recovery unit 8, in which the mixture of ammonia, carbon dioxide, nitrogen and excess air passes upwardly through a permeable mass 8a of packing material, in counter-current contact with descending dilute aqueous sulphuric acid (e. g.) continuously sprayed into the upper part of the unit from spray head 12a by pump 12 whose intake is connected by pipe 11 to a supply of the dilute acid contained in tank 10. The gaseous ammonia is taken up by the dilute sulphuric acid, reacting therewith to form a solution of ammonium sulphate, which is strongly acid initially and collects in the bottom of unit 8, flowing therefrom through pipe 8b into the acid supply tank 10. The gases other than ammonia escape absorption almost entirely and are discharged through vent 9 to atmosphere.

The arrangement here illustrated is such that the ammonia-absorbing liquid can be continuously recirculated through unit 8 until the free sulphuric acid has been so largely exhausted that the liquid contains little but ammonium sulphate.

It is evident that the quantity of ammonium sulphate present in the solution contained in tank 10 at the conclusion of the processing of a given quantity or batch of waste cyanide liquor is substantially twice that chemically required to treat a succeeding batch of waste cyanide liquor of the same size. Accordingly, tank 10 is desirably provided with a valved discharge pipe 14 through which an appropriate quantity of ammonium sulphate solution may be withdrawn from time to time for eventual recovery of the ammonium sulphate therein by evaporation, as a valuable by-product suitable for commercial use. Pipe connections 13, 13a are provided whereby remaining ammonium sulphate solution may be withdrawn from tank 10 by pipe 15 and delivered into the reaction tank 2, thereby facilitating recycling of the required amount of the ammonium salt solution produced in the recovery unit 8 for treatment of a succeeding batch of cyanide liquor in reaction vessel 2. Pump 13a is provided with shut-off valve 16 which is normally closed but which is opened when it is desired to add the required amount of ammonium salt solution to a succeeding batch. If the solution thus supplied to the reaction tank 2 from supply tank 10 contains some free sulphuric acid, this is obviously not objectionable when the cyanide liquor to be treated is more or less strongly alkaline, as is usually the case.

Because of the fact that, under optimum operating conditions, some excess of the ammonium salt beyond what is theoretically required by the over-all reaction is employed in the reaction mixture contained in tank 2, this excess ammonium salt remains in the detoxified liquor in tank 2 at the end of the treating operation and is discharged therewith from tank 2 through valved discharge outlet 17. Since it is not commercially profitable to treat the treated effluent for recovery of this relatively small content of ammonium salt, there is this fairly constant but tolerably small loss of ammonium salt from the process as it is ordinarily carried out under commercial operating conditions. For the most economical operation, it is manifestly desirable to keep this loss down to a minimum by adding to the untreated waste cyanide liquor no greater excess of ammonium salt than is found by experience to be necessary to get the desired results. Generally speaking, the excess of ammonium salt added should most desirably amount to at least about 10% of the molar equivalent of the cyanide content of the liquor to be processed; and employment of a larger excess, while less economical, does no harm.

The detoxified effluent also contains sodium sulphate in this particular instance, and it is of course possible, although usually not commercially worth while, to recover this by suitably processing said effluent.

By proceeding in the manner described in the foregoing specific example it is feasible in practice to achieve the important advantage hereinabove emphasized, namely, elimination of cyanide from the waste cyanide liquor so completely that sensitive chemical tests for cyanide fail to show the presence of any residual cyanide in the treated liquor. As has already been pointed out, this is due to the fact that the end products of cyanide decomposition or destruction, resulting from treatment of a waste cyanide liquor in accordance with the invention, are gases, viz.: ammonia ($NH_3$) and carbon dioxide ($CO_2$), which are both completely removed from the liquor as they are formed. Consequently the over-all chemical reaction proceeds continuously in the direction of those end products until completed, and no reversal of the reaction can take place under the described operating conditions. While some of the ammonia and carbon dioxide will dissolve into the water in reaction tank 2 as they are formed, the continued blowing of air through the solution for a sufficient period of time after the reaction has been completed serves to remove these gases from the liquor, especially at the relatively high temperature, approximately boiling, at which the reaction is most desirably effected; and the presence of some ammonia and/or carbon dioxide in the effluent at the conclusion of the treatment would present no disposal problem in any event.

In the foregoing specific illustrative example of how the new process may be carried out in practice, reference has been made to a waste sodium cyanide liquor as typical, because sodium cyanide is the cheapest cyanide available for the commercial use and hence is the cyanide most widely encountered in industrial waste liquors. But, so far as is known, the new process is applicable to the detoxification of any industrial waste liquor, regardless of its source, containing one or more soluble cyanides of whatever specific character.

Although the employment of air as the oxidizing medium in carrying out the process is generally to be recommended as most desirable from the standpoint of economical operation, the invention is in no sense restricted to the use of air for this purpose or even to the use of an oxidizing medium that is gaseous. Thus, it is possible to add to the liquor to be treated in the reaction vessel one or more oxidizing agents such as sodium permanganate, sodium hypochlorite, or a chlorate such, for example, as potassium chlorate, and accomplish the desired over-all reaction, employing heat to expedite the reaction. But there is nothing to be gained, ordinarily, by substituting for air such alternative oxidizing agents as have been just indicated, and it is usually uneconomical to do so. Moreover, the use of such agents results in introducing additional foreign material into the liquor and the treated effluent, something which is avoided by using air or oxygen. Of the indicated alternative agents, sodium hypochlorite is less desirable than the others because its use necessitates employment of the ammonium sulphate or other ammonium salt in greater proportion than would otherwise be required.

Other things being equal, it is ordinarily most advantageous to use ammonium sulphate as the ammonium compound that is added to the waste cyanide liquor in order to ensure the required ammonium ion concentration in carrying out the novel process. This is because ammonium sulphate is readily available commercially at relatively low cost, and it can also be cheaply produced as a by-product from the ammonia resulting from the destruction or decomposition of cyanide in carying out the present process. However, as has already been pointed out hereinabove, it is feasible to use any of various other water-soluble ammonium salts instead of ammonium sulphate. Thus, in place of the sulphate, it is feasible to use the chloride, nitrate, phosphate, bromide, iodide, or fluoride, all of which are ammonium salts of inorganic acids. Ammonium salts of certain organic acids, such as the formate or oxalate, can be employed. Indeed, it is feasible to use an ammonium salt of any acid, inorganic or organic, which salt ionizes sufficiently in water solution to ensure the necessary concentration of ammonium ion in the cyanide liquor being processed.

The use of ammonium phosphate as the added ammonium salt, and the recovery of the evolved ammonia end product by means of dilute phosphoric acid, has certain practical advantages which, under some circumstances, might render this procedure more desirable than that described in the specific example hereinabove given, especially since recent industrial developments have led to relatively cheap production of phosphoric acid. That part of the ammonium salt by-product of the process which is not recycled but is withdrawn from circuit and recovered as such has greater value for the manufacture of fertilizer when it is in the form of ammonium phosphate than when it is in the form of ammonium sulphate. Hence, with sufficiently cheap phosphoric acid available, this alternative procedure may in some cases be preferable to that hereinabove specifically described.

Although, as hereinabove pointed out, one of the important advantages of the present process is that it enables the cyanide content of cyanide liquors to be completely destroyed or decomposed into innocuous end products through the use of inexpensive chemicals and relatively simple apparatus, it is not to be inferred that the invention is restricted to a procedure wherein such complete destruction or decomposition occurs. The benefits of the invention can be realized in substantial part without achieving such complete destruction. Thus, by destroying only a considerable proportion of the cyanide content of a cyanide liquor through treatment of the liquor in accordance with the principles of the invention, a liquor of greatly reduced cyanide content is obtainable which may be sufficiently low in cyanide to be discharged directly into sewers or streams without causing actually objectionable stream pollution or running counter to municipal or other control regulations. Such incompletely treated effluents may indeed contain enough or more than enough cyanide to give a positive test for cyanide ion by one or more of the tests hereinabove mentioned. Moreover, even though it should not be feasible to discharge such effluent directly into sewers or streams, it might be entirely proper to do so after sufficiently diluting it with ordinary water and thereby lowering its cyanide concentration to a safe point. It is accordingly obvious that practice of the process in this non-optimum manner nevertheless involves utilizing the principles of the invention and realizing its benefits in large measure. In its broader aspects, therefore, the invention is to be understood as comprehending these and analogous practices, notwithstanding the fact that in what is now regarded as the best mode of practicing the invention the elimination of cyanide is so complete that sensitive qualitative tests of the treated liquor for cyanide content are negative.

Under the conditions of solution pH and ammonium ion concentration hereinabove prescribed, the over-all reaction characterizing the new process will also occur when the process is applied to detoxification of waste cyanide liquors which contain a constituent, such as sulphur (e. g. as hydrogen sulphide) or iron, with which cyanide can also react, under these conditions, to form other cyanogen compounds, such as thiocyanates or ferrocyanides, that are relatively non-toxic. In treating such a liquor by the process of the present invention, the extent to which its cyanide content will be converted into such complex cyanogen compounds instead of being destroyed or broken up with production of ammonium and carbon dioxide, will naturally depend upon such practical considerations as the specific composition of the given liquor and the particular operating conditions involved. But in any case, the novel result will be achieved that some cyanide, at least, will be destroyed which would otherwise unavoidably remain in the liquor unaltered. This is for the reason, previously pointed out hereinabove, that the reactions producing said complex cyanogen compounds are equilibrium reactions that do not go to completion; so that where only such an equilibrium reaction occurs in a cyanide liquor, there must inevitably persist, uneliminated, the equilibrium proportion of unconverted cyanide which, however, can be eliminated to any desired extent by application of the process of the present invention. It is to be understood, therefore, that the treatment of cyanide liquors containing compounds of iron or sulphur is not excluded from the scope of the present invention.

This application is a continuation-in-part of prior copending application Serial No. 320,368, filed by the present applicant February 23, 1940, now abandoned.

What is claimed is:

1. The process of detoxifying a waste cyanide liquor which comprises adjusting the composition of said liquor to such extent as may be necessary to give it a pH of from 5 to 8 and ensure the presence therein of ammonium ion in concentration greater than is chemically equivalent to its cyanide content, and subjecting the liquor, at a temperature not substantially below 60° C., to oxidizing conditions effective to decompose most of its cyanide content, with formation of ammonia and carbon dioxide.

2. The process of detoxifying an alkaline waste liquor containing an alkali metal cyanide which comprises adding to a body of said liquor sufficient quantities of an acid and an ammonium salt to render said liquor approximately neutral and to ensure the presence therein of ammonium ion in concentration at least substantially equivalent, chemically, to its cyanide content, heating the liquor to at least about 60° C. and blowing air through it until its cyanide content has been largely decomposed, with formation of ammonia and carbon dioxide.

3. The process of detoxifying an alkaline waste liquor containing an alkali metal cyanide which comprises adding to a body of said liquor sufficient quantities of an acid and an ammonium salt to render said liquor approximately neutral and to ensure the presence therein of ammonium ion in concentration at least substantially equivalent, chemically, to its cyanide content, heating the liquor to substantially boiling and blowing air through it until substantially its entire cyanide content has been decomposed, with formation of ammonia and carbon dioxide.

4. The process of detoxifying an alkaline waste liquor containing sodium cyanide which comprises adding to a body of said liquor sufficient quantities of sulphuric acid and ammonium sulphate to render said liquor approximately neutral, the ammonium sulphate being added in amount greater than is chemically equivalent to the cyanide content of said liquor, heating the liquor to at least about 60° C. and blowing air through it until its cyanide content has been largely decomposed into ammonia and carbon dioxide.

5. The process of detoxifying an alkaline waste liquor containing sodium cyanide which comprises adding to a body of said liquor sufficient quantities of sulphuric acid and ammonium sulphate to render said liquor approximately neutral, the ammonium sulphate being added in amount greater than is chemically equivalent to the cyanide content of said liquor, heating the liquor to approximately boiling and blowing air through it until substantially its entire cyanide content has been decomposed, with formation of ammonia and carbon dioxide.

6. The process of destroying cyanides of the group consisting of alkali metal, ammonium, hydrogen and alkaline-earth-metal cyanides contained in industrial waste liquors, which comprises adding a water-soluble ammonium compound to such a liquor and blowing air through the liquor while it is at a temperature not substantially below 60° C., until substantially the entire cyanide content of the liquor is decomposed into ammonia and carbon dioxide and removed from the liquor.

7. The process of destroying cyanides of the group consisting of alkali metal, ammonium, hydrogen and alkaline-earth-metal cyanides contained in industrial waste liquors, which comprises adding oxygen and a water-soluble ammonium compound to such a liquor and heating it to between 90° and 100° C., so as to decompose substantially the entire cyanide content of the liquor into ammonia and carbon dioxide, and removing these from the liquor.

8. The process set forth in claim 4, which further includes recovering ammonia evolved from the liquor undergoing treatment by absorbing it in dilute sulphuric acid, and utilizing resultant ammonium sulphate solution to adjust the composition of more waste cyanide liquor in the manner set forth.

ALLEN S. SMITH.

REFERENCES CITED

The following references are of record in the file of this patent:

UNITED STATES PATENTS

| Number | Name | Date |
| --- | --- | --- |
| 2,169,282 | Pieters | Aug. 15, 1939 |

OTHER REFERENCES

Williams, Cyanogen Compounds, pages 35, 36, and 174, (1915); Pub. by J. & A. Churchill, London.

Colman et al., Journal of the Society of Chemical Industry, vol. 37, No. 24, pages 319–324, (1918).